United States Patent
Rafin et al.

(10) Patent No.: US 9,523,560 B2
(45) Date of Patent: Dec. 20, 2016

(54) DECOY METHOD, DEVICE AND SYSTEM FOR PROTECTING AN AIRCRAFT

(71) Applicant: MBDA FRANCE, Le Plessis-Robinson (FR)

(72) Inventors: Vincent Rafin, Bourges (FR); Guillaume Le Louarn, Coat-meal (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 14/405,383

(22) PCT Filed: Jun. 4, 2013

(86) PCT No.: PCT/FR2013/000139
§ 371 (c)(1),
(2) Date: Dec. 3, 2014

(87) PCT Pub. No.: WO2013/182761
PCT Pub. Date: Dec. 12, 2013

(65) Prior Publication Data
US 2015/0176951 A1 Jun. 25, 2015

(30) Foreign Application Priority Data
Jun. 7, 2012 (FR) ...................... 12 01642

(51) Int. Cl.
*F41H 11/02* (2006.01)
*F42B 12/70* (2006.01)
*G01S 7/38* (2006.01)

(52) U.S. Cl.
CPC ............... *F41H 11/02* (2013.01); *F42B 12/70* (2013.01); *G01S 7/38* (2013.01)

(58) Field of Classification Search
CPC ........... F41H 11/02; F41H 12/70; F42B 12/70; G01S 7/38; B64D 1/12

USPC ....... 102/335, 336, 338, 340, 342, 343, 505; 89/1.54, 1.51

See application file for complete search history.

(56) References Cited

U.S. PATENT DOCUMENTS

| 4,333,402 A * | 6/1982 | Landstrom | F42B 12/70 102/340 |
| 4,406,227 A * | 9/1983 | Beeker | F42B 12/70 102/351 |
| 4,498,392 A * | 2/1985 | Billard | B64D 1/06 102/342 |

(Continued)

FOREIGN PATENT DOCUMENTS

| FR | 1102193 | 4/1954 | |
| WO | WO 2005030576 A2 * | 4/2005 | B64D 3/02 |

OTHER PUBLICATIONS

International Search Report (PCT/ISA/210) for PCT/IB2013/000139 mailed Aug. 26, 2013.

*Primary Examiner* — John D Cooper
(74) *Attorney, Agent, or Firm* — Koppel, Patrick, Heybl & Philpott (57) ABSTRACT

The decoy method, of the type in which: an ejectable on-board decoy provided with a decoy charge (13) is enclosed inside a streamlined cylindrical body (9) mounted ejectably on the aircraft (1); the streamlined cylindrical body (9) containing the decoy is ejected parallel to the aerodynamic stream of the aircraft; the decoy charge (13) is removed from the streamlined cylindrical body (9) while keeping the decoy charge attached to said body; and the decoy charge removed from the body is operated to render it active.

10 Claims, 4 Drawing Sheets

(56) References Cited

U.S. PATENT DOCUMENTS

| | | | | |
|---|---|---|---|---|
| 4,630,055 | A * | 12/1986 | Wessel | H01Q 15/145 102/505 |
| 4,852,455 | A * | 8/1989 | Brum | F41J 9/10 244/1 TD |
| 4,852,456 | A | 8/1989 | Thornburg | |
| 5,179,778 | A * | 1/1993 | Dickson | B01D 39/2017 29/33 F |
| 5,198,609 | A * | 3/1993 | Gillman | B64D 1/16 102/357 |
| 5,341,343 | A * | 8/1994 | Aske | F41H 11/02 102/393 |
| 5,390,605 | A * | 2/1995 | Meili | F02K 9/18 102/336 |
| 5,445,078 | A * | 8/1995 | Marion | F42B 12/70 102/334 |
| 5,561,260 | A * | 10/1996 | Towning | C06B 27/00 102/336 |
| 5,585,594 | A * | 12/1996 | Pelham | C06B 27/00 102/336 |
| 5,817,969 | A * | 10/1998 | Ettmuller | F42B 12/60 102/357 |
| 5,915,694 | A * | 6/1999 | Brum | H01Q 15/145 102/501 |
| 6,230,629 | B1 * | 5/2001 | Doctor | F42B 4/28 102/337 |
| 6,463,856 | B1 * | 10/2002 | Koch | F42B 5/15 102/247 |
| 6,857,371 | B1 * | 2/2005 | Lagrange | F42B 12/48 102/377 |
| 7,614,334 | B2 * | 11/2009 | Bellino | F41H 11/02 102/340 |
| 7,866,246 | B2 * | 1/2011 | Bellino | F41H 11/02 102/340 |
| 8,695,847 | B2 * | 4/2014 | Sjobeck | B64D 1/02 102/505 |
| 2002/0117073 | A1 * | 8/2002 | Brum | F41H 11/02 102/505 |
| 2004/0011235 | A1 * | 1/2004 | Callaway | F41J 2/02 102/336 |
| 2004/0069898 | A1 * | 4/2004 | Peckham | B64D 3/02 244/10 |
| 2004/0200381 | A1 * | 10/2004 | Zatterqvist | B64D 7/08 102/505 |
| 2004/0200382 | A1 * | 10/2004 | Zatterqvist | B64D 7/08 102/505 |
| 2007/0234922 | A1 * | 10/2007 | Van Laar | F41J 2/00 102/336 |
| 2011/0155856 | A1 * | 6/2011 | Zachrisson | B64D 7/00 244/136 |
| 2014/0196597 | A1 * | 7/2014 | Le Croller | F41A 9/72 89/1.51 |

* cited by examiner

DECOY METHOD, DEVICE AND SYSTEM FOR PROTECTING AN AIRCRAFT

The present invention concerns a decoy method and device for protecting an aircraft, such as an aeroplane or a helicopter.

It is known that, in order to respond to the various threats that must be faced by a fighter aircraft, for example, the latter is equipped, in addition to the usual offensive weapon systems, with on-board defensive decoy systems. According to the type of threat, the systems comprise decoy devices with charges of various natures, for example electromechanical (chaff), electromagnetic (jamming), or pyrotechnic (infrared).

In the case of infrared decoys, the charge to be ejected is in the form of a controllable block, parallelepipedal or other, issuing from a reception case or tube of the device loaded on the aeroplane.

Such decoy charges have the drawback that, after ejection thereof from the carrier aircraft, they are subjected to significant braking due to the high drag thereof, through the irregular, non-profiled shape thereof, so that the carrier aircraft rapidly moves away from them. The result is that the protection that they afford for the aircraft is of short duration.

In order to improve the efficacy of these decoy devices, the decoys with their charge may be enclosed in cylindrical bodies housed in tubular reception supports of the systems integral with the aeroplane, in order to be ejected from the support parallel to the aerodynamic stream of the aeroplane. Thus, when a threat is detected, the cylindrical body of the device (with the decoy and its decoy charge), thus ejected from the tubular support and as a result of its profiled shape, stabilises more rapidly in the aerodynamic stream of the aeroplane and remains close to the latter for longer.

However, the problem is posed of ejecting the decoy charge, in particular when it is pyrotechnic, out of the cylindrical body. This is because, once ejected from the body, the initiated charge has the same drawbacks as before, namely high drag and efficacy of short duration, because of the rapid distancing between the aeroplane and the charge.

Through the document U.S. Pat. No. 4,852,456, a decoy system is known in which the decoy charge is ejected from the body by cable connected to the aeroplane.

The object of the present invention is to remedy these drawbacks and the present invention concerns a decoy method and device for optimising the efficacy of the decoy charges, preferably, though not exclusively, when they are of the infrared type.

To this end, the decoy method for protecting an aircraft by means of at least one ejectable on-board decoy, provided with a decoy charge, is of the type wherein:
said decoy is enclosed in a streamlined cylindrical body, mounted ejectably on the aircraft,
said streamlined cylindrical body enclosing the decoy is ejected, parallel to the aerodynamic stream of the aircraft, and
the decoy charge is removed from said body.
According to the invention, the method is characterised in that, after the ejection of the cylindrical body,
said decoy charge is held in a position removed from said ejected streamlined cylindrical body, and attached to the latter, and
said decoy charge removed from the body is controlled in order to make it active.

Thus, as the decoy charge is held in the streamlined cylindrical body, the profile of which, with low drag, enables it to remain more in the aerodynamic stream of the aeroplane, the efficacy of the charge is then at a maximum. Not only does it best follow the aircraft through the cylindrical body but, in addition, being in direct contact with the outside environment, all the energy of the charge, when it is initiated, is dedicated to the decoying proper, rather than to the destruction of a protective envelope or layer that would impair the performance of the charge.

Moreover, as the decoy charge remains connected to the cylindrical body, the resulting device, namely the cylindrical body and the decoy, is heavier, so that the deceleration thereof would be all the lower, enabling it to follow the aircraft for longer and to provide greater protection thereof.

Advantageously, the charge is moved by sliding with respect to the streamlined cylindrical body. Thus a simple translation removes the charge from the cylindrical body.

With respect to the streamlined cylindrical body, it is possible to slide the charge towards the front or rear of said body. It is thus possible to provide two decoys with respectively one charge at the front of the cylindrical body and one charge at the rear of said body, said charges being able to emerge simultaneously or sequentially out of the body while being kept attached thereto.

The invention also concerns a decoy device for protecting an aircraft, implementing the above method and of the type comprising, in a streamlined cylindrical body, at least one decoy having a decoy charge, and controllable means for removing the decoy charge with respect to the body.

Advantageously, the device is characterised in that the controllable removal means are provided between the decoy and the cylindrical body and hold the decoy charge in the removed position, with respect to the body, attached to the latter.

Preferably, the means for removing and holding the charge are of the type acting by sliding along the axis of the streamlined cylindrical body in order to occupy a retracted position in which the decoy charge is enclosed, and a removed position in which the charge is outside said body, while being held with respect to the latter.

For example, the removal and holding means may comprise parallel support rails, capable of sliding with respect to the cylindrical body and between which the decoy charge is received and held in the removed position.

In a variant, the removal and holding means may be of the telescopic type, housed in the cylindrical body and holding the decoy charge in the removed position with respect to the cylindrical body.

In particular, in order to make the removal and holding means pass from the retracted position inside the body to the removed position outside the body, the device comprises initiator-type controllable means mounted in the decoy.

In addition, the device includes safety means provided in the decoy between the initiator-type controllable means and the decoy charge, preventing any triggering of the charge as long as the removal and holding means occupy the retracted position.

Moreover, the initiator-type controllable means can control, in addition to the movement of the removal and holding means, the activation of the decoy charge when it is in the removed position.

The invention also concerns a decoy system for protecting an aircraft, the system comprising:
a tubular support for receiving a streamlined cylindrical body of a decoy device, said support capable of being fixed to the aircraft; and
a mechanism for ejecting the decoy device with respect to said support.

The system is characterised in that the decoy device is as defined above.

The figures of the accompanying drawing will give a clear understanding of how the invention can be implemented. In these figures, identical references designate similar elements.

Figure 1:
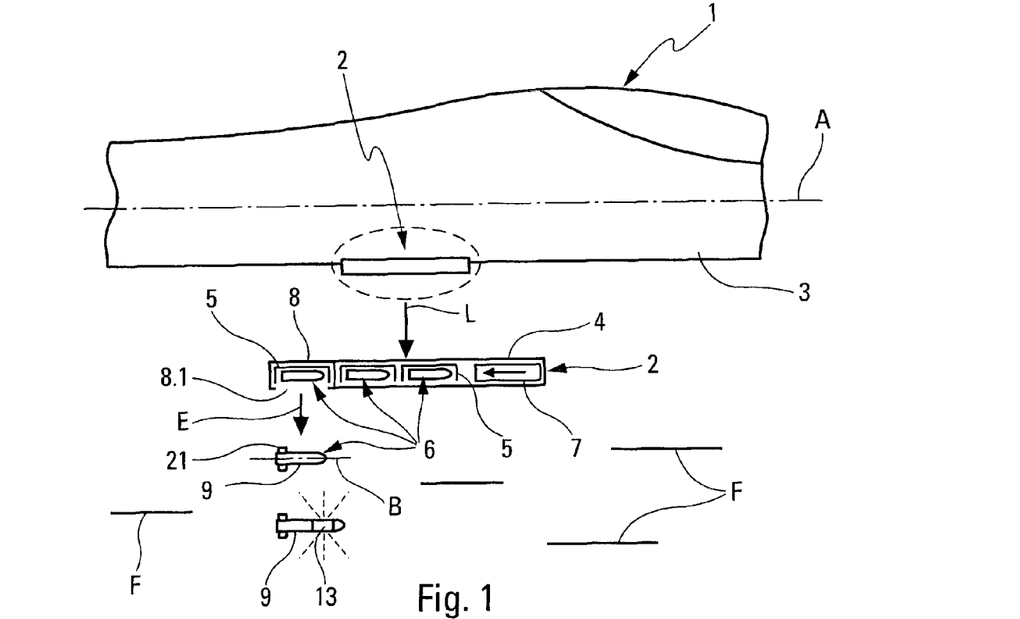
FIG. 1 is a partial schematic view of an aircraft equipped with an on-board decoy system comprising a plurality of decoy devices in accordance with the invention.

The aircraft 1, such as a fighter aircraft depicted partially in FIG. 1, is equipped with a decoy system 2, represented by a rectangle under the fuselage 3 of the aeroplane and illustrated with enlargement and schematically by the magnification L, under the aeroplane. The longitudinal axis A of the latter is also indicated, as is the aerodynamic stream represented by the arrows F between the air and the external environment and substantially parallel to the axis A.

The system 2 may be the one taught in the French patent application 11 02193 of the applicant, and reference can thus be made thereto for further information.

Briefly, this decoy system 2, elongated in shape, comprises at least one cylindrical tube 4, inside which there are successively housed support cradles 5 for receiving decoy devices 6 of the invention, also referred to as decoy projectiles or vehicles, a control mechanism 7 for the successive advance of the cradles 5 with projectiles 6 in the tube 4 and, in this embodiment, a module 8 for ejecting, through a lateral opening 8.1 provided in the module, the projectile previously separated from its support cradle, into the external environment in the direction of the arrow E, as shown by FIG. 1.

Through the arrangement of the tube 4 of the system 2 parallel to the axis A of the aeroplane, and through the module 8 orthogonally ejecting the projectile 6 out of the tube through the opening 8.1, the projectile remains parallel in order to be situated substantially in the aerodynamic stream F. This is because, as the projectile 6 comprises a streamlined body 9, cylindrical of revolution, of longitudinal axis B and with an annular cross section, it is oriented directly parallel to the stream after ejection and offers minimal drag. In this way, the projectile quickly stabilises in the stream and remains close to the aeroplane, for the time that the decoy charge present in the internal housing 9.1 of the cylindrical body 9 of the projectile is functional.

For information, the system 2 could comprise a plurality of tubes 4 in parallel, with a series of decoy devices 6 in each of them. The streamlined cylindrical body 9, identical for each decoy device, could also contain, in its internal housing, various types of charge in order to deal with the various threats mentioned above.

The same body may even contain a plurality of charges, with in particular sequenced activations.

Figure 2:
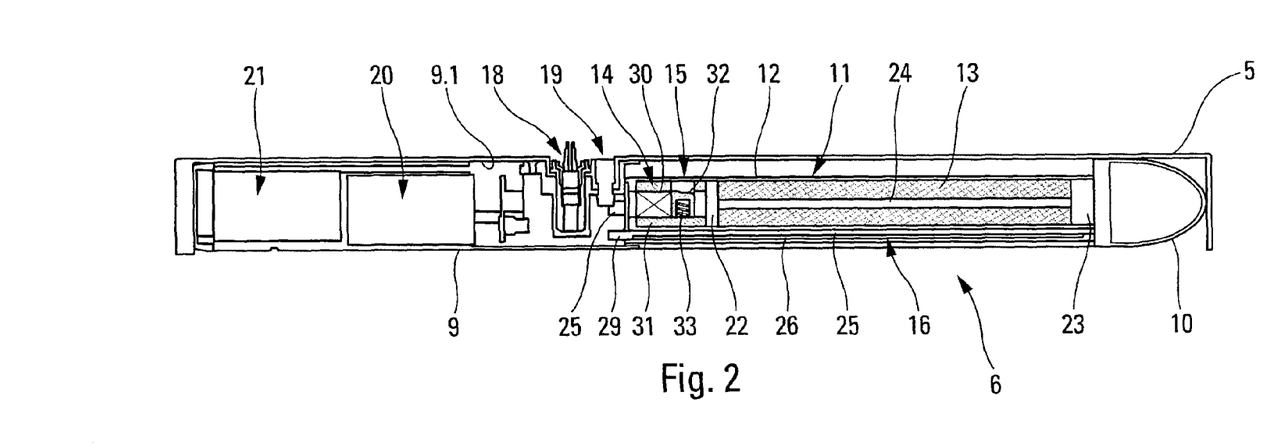
FIG. 2 is an axial section of one of the decoy devices mounted in a support cradle of the decoy system, before the ejection of the device from said cradle.

The decoy device shown in FIG. 2 is associated with its respective support cradle 5, introduced into the ejection module, for example, ready to be fired.

In the streamlined cylindrical body 9, the decoy device 6 is composed of a plurality of separate parts.

Thus, from front to rear, there is a front part with a rounded cover 10 terminating the streamlined body. Then, the following part contains the decoy 11 proper with, inside a cylindrical or parallelepipedal case or envelope 12, its charge 13, pyrotechnic for example, initiator-type controllable means 14, safety means 15 and, according to the invention, movable means 16 for removing and holding the charge.

After the decoy part 11, there is a middle part with means 18 for ejecting the decoy device 6 with respect to the cradle 5, and a connector 19 for the device to communicate with the aeroplane, and a part in which there is housed, in particular, the necessary energy source 20 (batteries, etc.) supplying the various components of the device. At the ejection means 18, there is also provided the mechanism for locking the device with respect to the cradle, not visible in the figures and described in the aforementioned patent application.

Finally, the device comprises a rear part in which there are deployable tail fins 21 of the device participating in stabilisation thereof in the aerodynamic stream (see in particular FIG. 1 with the projectile or device 6 and the tail fins 21 that are deployed as soon as it is ejected, in the direction of the arrow E, from the cradle 5, before and after the charge 13 is removed from the decoy 11 by the means 16).

Figure 3:
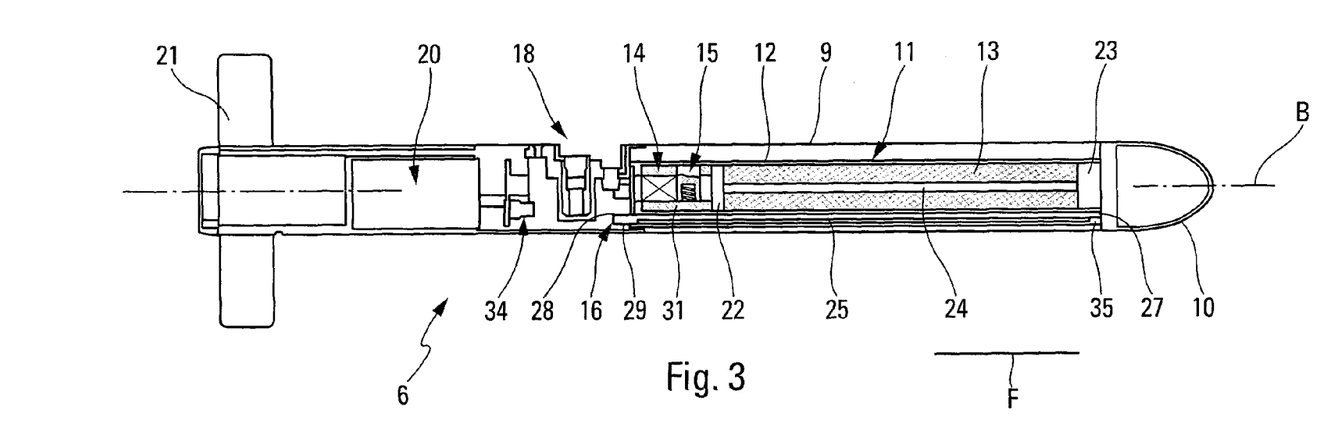
FIG. 3 is a plan view of the decoy device after ejection thereof from the support cradle in the aerodynamic stream of the aircraft, and before the decoy charge is removed from the device.

As shown by FIGS. 2 and 3, the decoy 11 is housed inside the cylindrical body 9 with its case 12 fixed with respect to the body, while the charge 13 is received in the case while being axially slid with respect thereto, and therefore with respect to the body. The charge 13 terminates in transverse end supports 22, 23 housed in the case and axially connected by a central rod 24, the support 22 being turned towards the initiator and safety means 14, 15 while the other support 23 is associated fixedly with the cover part 10. The charge is thus disposed around the rod 24 and between the two supports 22, 23.

The decoy charge, although of the pyrotechnic type in this example, could be of the pyrophoric type, of the electromagnetic (chaff) type for jamming purposes, or other.

Between the case 12 of the decoy and the cylindrical body 9, the means 16 for removal of the charge, which are for movement by sliding, are provided. In the example embodiment depicted in FIGS. 2 to 5, the movable support means 16 are in the form of sliding rails 25, parallel and spaced apart from each other, so as to remove the charge 13 out of the body, to support the charge and to hold it in place between the cover part 10 and the cylindrical body 9 when it is removed from the cylindrical body following the sliding of the rails.

Figure 5:
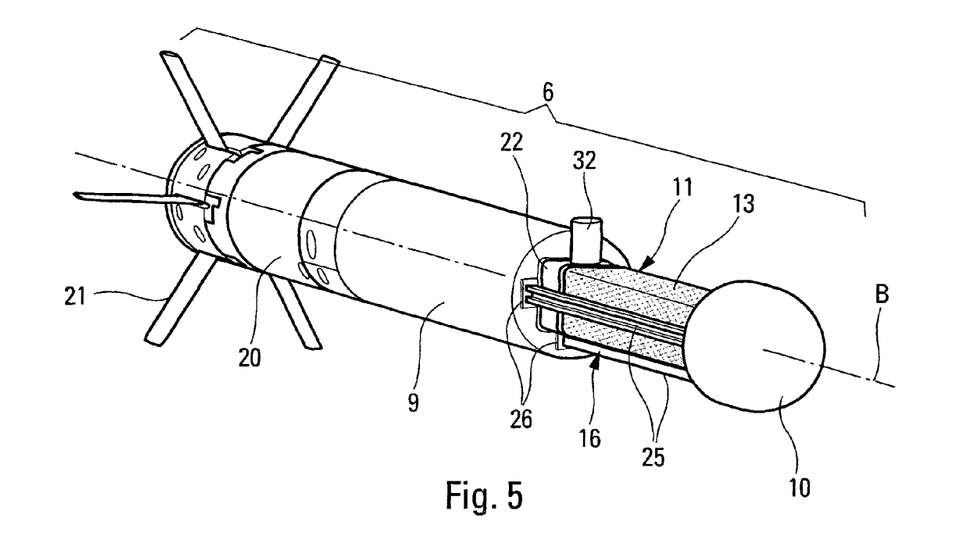
FIG. 5 is a perspective view of the ejected decoy device with the charge removed.

In particular, the rails 25 are, for example, three in number while being distributed around the charge 13 so as to enclose it (a lower rail and two others on the sides substantially in opposition, see FIG. 5). The rails 25 are mounted in slides 26 attached along the inside of the cylindrical body or formed therein. And they terminate in distal ends 27 secured to the cover 10, while its proximal ends 28 remain inside the cylindrical body 9 and terminate in external shoulders 29 intended to serve as an axial stop in the removed position of the rails.

The movement means 16 connected to the cover in this example could be situated on the same side as the tail fins 21 in order to remove the charge towards the rear of the projectile 6.

When the order to eject the decoy device 6 with respect to the support cradle 5 is given, the ejection means 18 of the pyrotechnic type act and retract the locking mechanism with retractable fingers, releasing the device 6 from the support cradle, perpendicular thereto, in the manner indicated in the aforementioned French patent application.

The process of ejecting the decoy device 6 is thus commenced.

As soon as the device 6 is removed into the external environment with the aerodynamic body 9, cylindrical of revolution, of axis B, substantially parallel to the stream F, the initially folded tail fins 21, housed in the rear part of the cylindrical body, spontaneously deploy under the action of associated elastic elements (springs), not shown, and thus effectively stabilise the decoy device in the stream F, with minimal drag through the streamlined form of the cylindrical body with cover.

FIG. 3 shows such an instant.

At this moment, it is necessary to remove and activate the charge 13 of the decoy 11. For this purpose, the initiator-type firing means 14 containing an internal charge, not shown, are actuated. These means 14 are fixed at the middle part of the device 6 and are received in an axial bore 30 in a cylindrical sleeve 31 that is mounted in the case 12 while being connected, in this example, to the transverse support 22 of the charge 13. In the bore 30 of the sleeve the safety means 15 are situated, which, by means of a transverse finger 32 in abutment against the case through the action of a spring 33, prevent communication between the charge of the initiator 14 and the decoying charge 13.

These means 14, known per se, are in particular used in decoys directly expelled from an aircraft.

Figure 4:
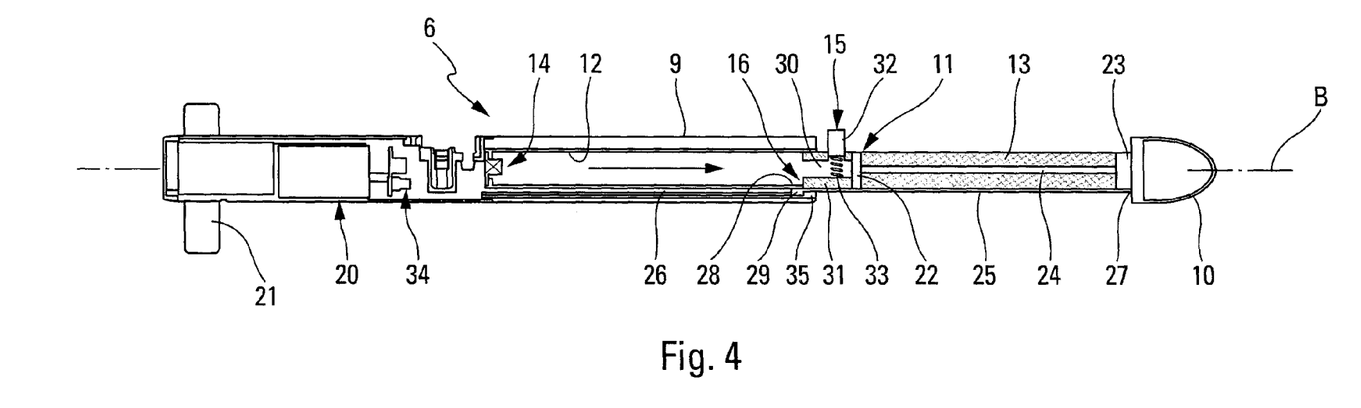
FIG. 4 is an axial section of the ejected decoy device, with the decoy charge outside the cylindrical body of the device, following the movement by sliding of the removal and holding means.

The control of the means 14 by initiation of the internal charge of the initiator is obtained by electrical firing equipment 34 situated in the middle part of the projectile and connected to the energy source 20. The initiator 14 of the internal charge is then fired and the gases issuing from the internal charge cause the translation movement of the rails 25 in the slides 26 of the cylindrical body 9, of the charge 13 of the decoy with respect to its fixed case 12, and of the cover part 10 fixed to the support 23. And this takes place until the moment when the external shoulders 29 of the rails are applied against an internal shoulder 35 terminating the cylindrical body 9 serving as an axial stop. The decoy charge 13 then occupies the removed position, out of the cylindrical body 9 and its case 12, while being held by the rails 25 and the supports 22, 23 as shown by FIGS. 4 and 5.

As a result of the sliding of the charge 13 with the cylindrical sleeve 31 connected to the support 22, the transverse finger 32 of the safety means is situated outside the body and thus emerges radially from the cylindrical sleeve 31 under the action of the spring 33, which releases the bore 30 of the sleeve and, in this example, puts the gases of the charge of the initiator 14 in communication with the charge 13 (the transverse support 22 having a central opening, not shown, for the gases to pass). The projecting finger 32 marks the removed position of the rails and prevents return thereof to the retracted position.

The charge 13 is thus activated and causes optimum radiation over its entire periphery with an instantaneous maximum power, since it is directly in contact with the external environment, without the case. Its efficacy, in particular when it is a pyrotechnic charge or the like, is then optimum vis-à-vis heat-seeking threats.

However, the decoy charge in the removed position may be initiated by any means other than the internal charge of the initiator, such as a triggering means directly associated therewith. It can also be envisaged removing and firing the charge by means of the gases issuing from the initiator enabling the device to be ejected with respect to the cradle.

It will therefore be understood that the decoy device 6 as described achieves its objectives in terms of optimisation of the monitoring of the aeroplane through the reduction in the deceleration obtained, on the one hand, by a reduction in the aerodynamic drag (projectile directly oriented in the aerodynamic stream, streamlined cylindrical shape with a reduced cross section, and stability and lift improved by the tail fins and the shape of the cover), and, on the other hand, through an increase in the ejected mass following the holding of the charge with the projectile.

Figure 6:
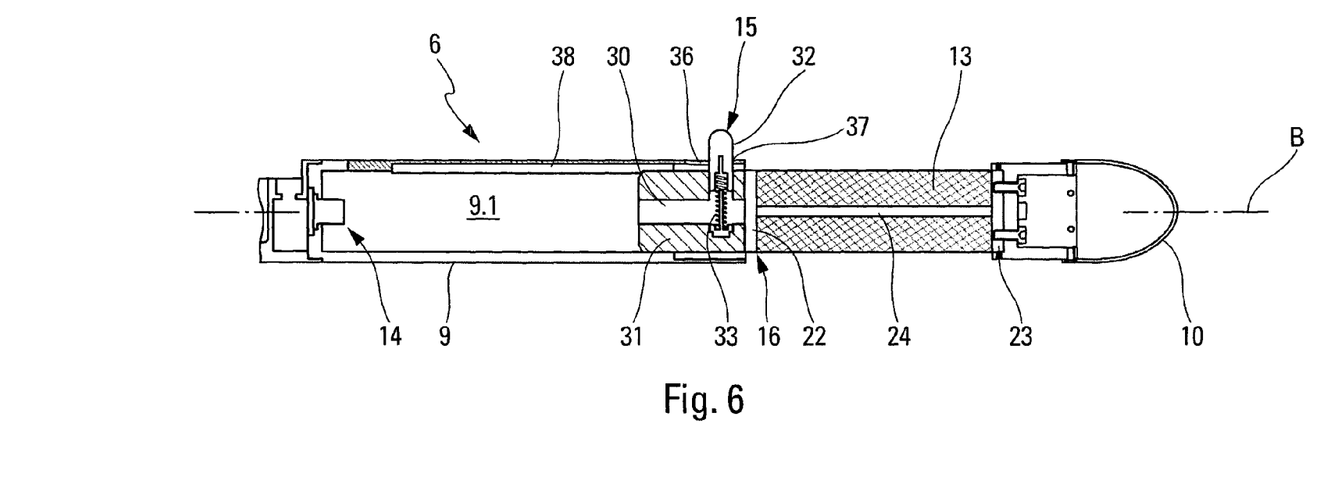
FIG. 6 is an axial section of a variant embodiment of the removal and holding means of the device, in the removed position of the charge.

A variant embodiment of the means 16 for removing and holding the charge is shown with regard to FIG. 6. Instead of the sliding rails, the removal means 16 are telescopic like a cylinder, with the decoy 11 itself serving as removal means, while being able to slide with respect to the body 9. The decoy is in particular cylindrical, mounted in the corresponding internal housing 9.1 in the cylindrical body 9 and, under the action of the initiator means 14, the charge 13 with the supports, the sleeve and the cover part, slides with respect to its case and therefore with respect to the cylindrical body, as far as the removed position illustrated, in which it is situated outside the body while being connected thereto.

The removed position is marked by the engagement of the finger 32 of the safety means, under the action of the spring 33, in a closed oblong slot 36 provided in the cylindrical body 9 parallel to the axis B thereof. It can be seen, in FIG. 6, that the finger 32 thus abuts axially against the corresponding bottom 37 of the slot, keeping the charge removed with respect to the body.

It should also be noted that a longitudinal groove 38 is provided in the body 9 in order to provide the axial guiding of the decoy, and therefore of the charge, between the retracted initial position and the removed final position following the activation of the initiator. The cylindrical sleeve 31, to which the support 22 for the charge 13 is connected, thus remains in the body for purposes of guiding and holding the decoy in the removed position with the cover, while the support 23 is fixed, as before, to the cover part 10, the connecting rod 24 connecting the two supports with the charge around it.

Figure 7:
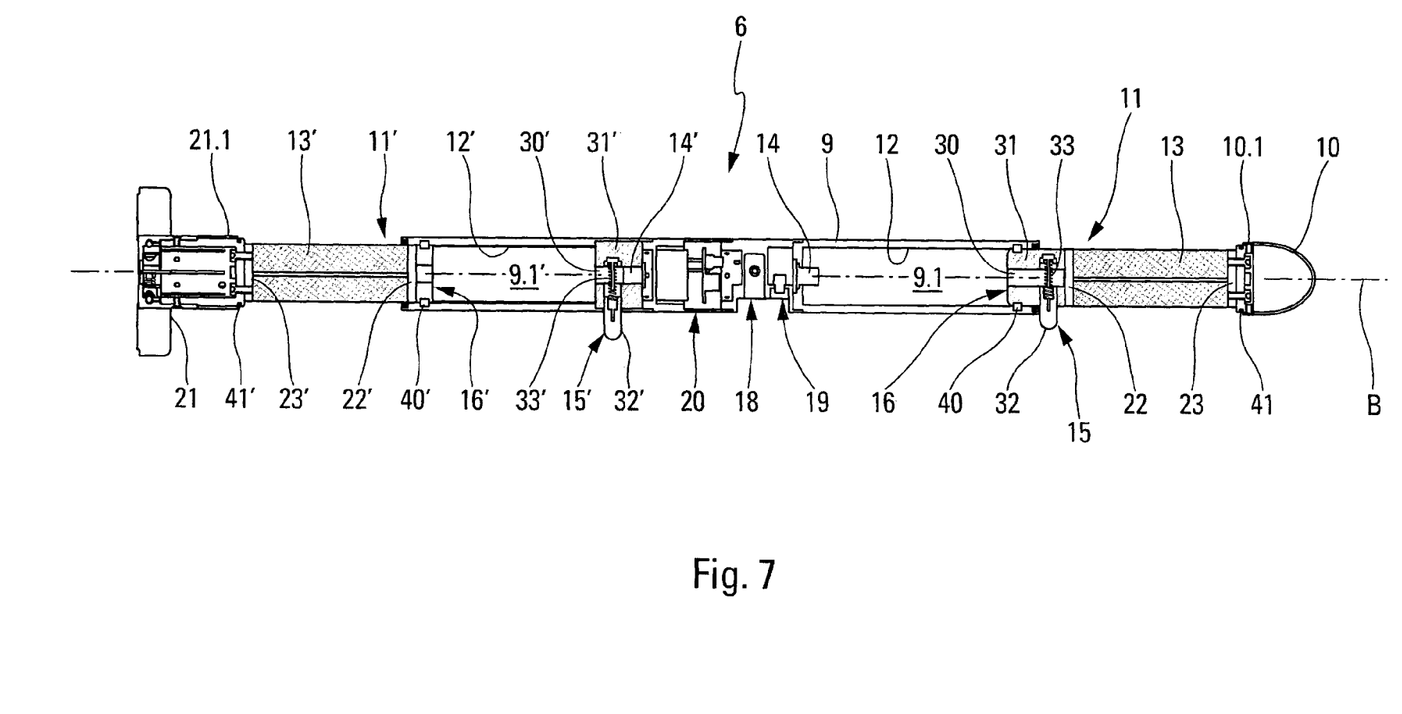
FIG. 7 is an axial section of another variant of the decoy device equipped with a front decoy and a rear decoy with the respective charges removed from the cylindrical body.

In the variant embodiment shown in FIG. 7, the decoy device or projectile 6 comprises two decoys with their respective charges in the active position, removed with respect to the cylindrical body 9.

Thus, in addition to the decoy 11 of the previous embodiment in FIGS. 1 to 6, situated on the front side of the device just behind the cover part 10, the device 6 of FIG. 7 is equipped with a decoy 11' on the rear side, just in front of the rear part with tail fins 21. In order to be able to house this rear decoy 11', the cylindrical body 9 is extended by the required length from the part 20 containing in particular the energy source towards the rear part with tail fins 21.

The two decoys 11 and 11' are arranged coaxially in the cylindrical body, along the axis B of the device 6, and each comprise, as before, a case 12, 12' received in the housing 9.1, 9.1', and the charge 13, 13' housed in the case. To allow the axial movement of the charge out of the body, the respective removal and holding means 16, 16' are, in this example, of the telescopic type similar to FIG. 6, that is to say the charge and the supports slide themselves, under the action of the controllable means 14, with respect to their cases connected to the body, so that each of the charges is brought out of the cylindrical body, while being held with respect thereto in the removed position.

The charge 13 of the front decoy 11 is carried by the supports 22, 23 respectively secured to the front cylindrical part 10.1 with the ogival cover 10 and to the cylindrical sleeve 31, sliding with the charge under the action of the initiator 14. The axial locking of the sleeve 31 (and therefore of the charge) with respect to the body is, in this embodiment, provided by a circlip or similar element 40, marking the removed position of the charge out of the body, which enables the safety finger 32, then out of the body, to project radially by means of the spring 33, in order to allow the gases from the initiator 14 to pass in the direction of the charge through the bore 30.

As for the charge 13' of the rear decoy 11', this is secured, by means of the support 23', to the cylindrical rear part 21.1 with tail fins 21, while the support 22' remains in the cylindrical body 9 while being axially locked therein by a circlip 40' so as to mark the removed position of the charge with the part with tail fins.

On the other hand, the cylindrical sleeve 31' with the safety means 15' with finger 32' remains fixed in position with respect to the cylindrical body 9 and the part 20 that is adjacent to the sleeve. In this case, the safety finger 32' is initially pressed in the radially retracted position in order to close off the bore 30' of the sleeve, by means of the lateral wall of the cradle 5 when the device or the vehicle 6 is still secured to the tubular support of the system 2 fixed to the aeroplane.

It will therefore be understood that, depending on the movable or fixed arrangement of the sleeve 31, 31' with safety finger, the charges 13, 13' of the decoys of the device are, driven in the active position, removed out of the body, in a way that is offset in time.

Thus, in the embodiment depicted, as soon as the device 6 is ejected from the cradle 5, the safety finger 32' of the rear decoy 11' is released and projects radially from the cylindrical body by means of the associated spring 33. In this way, the gases from the initiator 14' then fired pass through the bore 30' in the sleeve 31' and drive, towards the outside of the body 9, the telescopic removal means 16' formed by the charge and the supports, in the removed position. Through this elimination of the safety element almost as soon as the device is ejected, the charge 13' is initiated rapidly.

On the other hand, with the front decoy 11, the safety finger 32 is released (radially projecting) only when the charge 13 is moved axially and held outside the cylindrical body, following the firing of the initiator 14, causing sliding of the sleeve 31 with finger 32.

The activation of the front charge 13 consequently takes place with a delay with respect to that of the rear charge 13'. Such an implementation of the vehicle 6 with two "offset" decoys may be favoured depending on the specific requirements so as to prolong the efficacy of the decoying, but is not fixed. It would be possible in fact to have two decoys with safety means with identical release fingers (with "slow or rapid" triggering), or the sleeves with safety fingers could be reversed in the device illustrated in order to have a more rapid release of the front decoy with respect to the rear decoy.

Moreover, it should be noted that the seal rings 41, 41' are provided around the cylindrical parts 10.1, 21.1 of the part with cover 10 and the part with tail fins 21. In the initial position of the decoys contained in the body of the devices themselves mounted in their respective cradles, these seal rings cooperate with the internal wall of the cylindrical body 9 so as to protect the charges vis-à-vis the external environment.

The invention claimed is:

1. A decoy device for protecting an aircraft, comprising:
   a streamlined cylindrical body housing configured to be ejected from the aircraft;
   at least one charge, coupled to the streamlined cylindrical body housing; and
   controllable means for exposing the at least one charge with respect to the streamlined cylindrical body housing, wherein said exposing means are provided between the at least one charge and the streamlined cylindrical body housing and hold the at least one charge in a removed position with respect to the streamlined cylindrical body housing.

2. The device according to claim 1, wherein the controllable exposing means expose the at least one charge along an axis of the streamlined cylindrical body housing, such that the at least one charge occupies a retracted position when the at least one charge is enclosed by the streamlined cylindrical body housing, and a removed position when the at least one charge is outside said streamlined cylindrical body housing while remaining coupled to the streamlined cylindrical body housing.

3. The device according to claim 1, wherein the controllable exposing means comprise parallel support rails arranged to slide with respect to the streamlined cylindrical body housing, such that the at least one charge is coupled to the streamlined cylindrical body housing between the parallel support rails.

4. The device according to claim 1, wherein the controllable exposing means comprise a telescopic type support, housed in the streamlined cylindrical body housing and holding the at least one charge in the removed position with respect to the streamlined cylindrical body housing.

5. The device according to claim 1, further comprising initiator-type controllable means for removing, mounted in the streamlined cylindrical body housing, to allow the controllable exposing means to pass from the retracted position inside the streamlined cylindrical body housing to the removed position outside the streamlined cylindrical body housing.

6. The device according to claim 5, further comprising safety means for preventing, between the initiator-type controllable means and the at least one charge, for preventing any triggering of the at least one charge while the controllable exposing means occupy the retracted position.

7. The device according to claim 6, wherein the safety means comprise at least one radially movable finger allowing the controllable exposing means to pass into the removed position under the action of the controllable exposing means when the streamlined cylindrical body housing separates from the aircraft.

8. The device according to claim 5, wherein the initiator-type controllable means control, in addition to the movement of the controllable exposing means, the activation of the at least one charge in the removed position.

9. The device according to claim 1, the at least one charge comprises a first charge at a front of the streamlined cylindrical body housing and a second charge at a rear of said streamlined cylindrical body housing, said first charge being arranged to a first controllable exposing means movable towards the front of the streamlined cylindrical body housing and the second charge coupled to a second controllable exposing means movable towards the rear of said streamlined cylindrical body housing.

10. A decoy system for protecting an aircraft, comprising:
a tubular support for receiving a streamlined cylindrical body of a decoy device, said tubular support being fixed to the aircraft; and
a mechanism for ejecting the decoy device with respect to said tubular support, wherein said decoy device is as defined according to claim 1.

* * * * *